United States Patent
Hillman

(10) Patent No.: US 11,887,274 B2
(45) Date of Patent: Jan. 30, 2024

(54) METHOD FOR INTERPOLATING PIXEL DATA FROM IMAGE DATA HAVING DEPTH INFORMATION

(71) Applicant: Unity Technologies SF, San Francisco, CA (US)

(72) Inventor: Peter M. Hillman, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 334 days.

(21) Appl. No.: 17/115,904

(22) Filed: Dec. 9, 2020

(65) Prior Publication Data
US 2022/0028034 A1 Jan. 27, 2022

Related U.S. Application Data

(60) Provisional application No. 63/057,260, filed on Jul. 27, 2020.

(51) Int. Cl.
*G06T 3/40* (2006.01)
*G06T 7/50* (2017.01)

(52) U.S. Cl.
CPC .............. *G06T 3/4007* (2013.01); *G06T 7/50* (2017.01); *G06T 2207/10024* (2013.01); *G06T 2207/10028* (2013.01)

(58) Field of Classification Search
CPC ..................... G06T 3/4007; G06T 7/50; G06T 2207/10024; G06T 2207/10028; G06T 15/40; G06T 15/405; G06T 19/20; G06T 2210/32
See application file for complete search history.

(56) References Cited

U.S. PATENT DOCUMENTS

| | | | |
|---|---|---|---|
| 6,760,024 B1* | 7/2004 | Lokovic | G06T 15/60 345/422 |
| 2006/0209065 A1* | 9/2006 | Lapidous | G06T 15/40 345/422 |
| 2006/0239558 A1* | 10/2006 | Rafii | G06V 20/64 382/181 |
| 2012/0235988 A1 | 9/2012 | Karafin et al. | |
| 2016/0314598 A1* | 10/2016 | Duff | G06T 9/00 |

OTHER PUBLICATIONS

Lokovic et al., "Deep Shadow Maps", Jul. 2000, ACM, SIGGRAPH '00: Proceedings of the 27th annual conference on Computer graphics and interactive techniques, p. 385-392. (Year: 2000).*

(Continued)

*Primary Examiner* — Vincent Rudolph
*Assistant Examiner* — Timothy Choi
(74) *Attorney, Agent, or Firm* — Haynes and Boone, LLP

(57) ABSTRACT

An image dataset comprising pixel depth arrays might be processed by an interpolator, wherein interpolation is based on pixel samples. Input pixels to be interpolated from and an interpolated pixel might comprise deep pixels, each represented with a list of samples. Accumulation curves might be generated from each input pixel, weights applied, and accumulation curves combined to form an interpolation accumulation curve. An interpolated deep pixel can be derived from the interpolation accumulation curve, taking into account zero-depth samples as needed. Samples might represent color values of pixels.

15 Claims, 12 Drawing Sheets

(56) References Cited

OTHER PUBLICATIONS

Egstad Jonathan: "Improved Deep image Compositing Using Subpixel Masks", Aug. 2015 (Aug. 8, 2015), XP055791689, Retrieved from the Internet: URL:http://s3.amazonaws.com/arena-attachments/1997792/6860f98de7e34f4d477b6109bb68aa_0e.pdf?1522893086 [retrieved on Mar. 30, 2021].
Kainz Florian: "Open EXR File Layout New Features for Open EXR 2.0: Multi-Part and Deep Data Comparison between Single-Part and Multi-Part File Layouts9 Multi-Part and Deep Data Header Attributes (New in 2.0)", Mar. 3, 2013 (Mar. 13, 2013), XP055791700, Retrieved from the Internet: URL:https://www.openexr.com/documentation/ openexrfilelayout.pdf [retrieved on Mar. 30, 2021] p. 12.
International Search Report and Written Opinion dated Mar. 30, 2021 issued in PCT/NZ2020/050171 (10 pages).

\* cited by examiner

METHOD FOR INTERPOLATING PIXEL DATA FROM IMAGE DATA HAVING DEPTH INFORMATION

CROSS-REFERENCE CROSS-REFERENCES TO PRIORITY AND RELATED APPLICATIONS

This application claims the benefit of, and priority from, U.S. Provisional Patent Application No. 63/057,260 filed Jul. 27, 2020, entitled "Method for Interpolating Pixel Data from Image Data Having Depth Information." The entire disclosure of the application recited above is hereby incorporated by reference, as if set forth in full in this document, for all purposes.

FIELD

The present disclosure generally relates to methods and apparatus for interpolating pixel data from image data and more particularly to interpolating images having depth information.

BACKGROUND

For computer-generated imagery or computer-enhanced imagery, whether individual images or video sequences of images sometimes referred to as frames, might be stored in computer memory such that computer systems, such as animation creation systems, renderers, projectors, etc. can access that imagery and operate on it or present it. In a basic representation, an image is stored in a form of a two-dimensional (2D) pixel array where each element of the pixel array corresponds to a position on the image and has a pixel color value. The pixel color value might have a single component value or might have a plurality of component values. The image can be displayed by coloring pixels of a display according to the pixel color values that correspond to positions of the display.

But one specific example is a stored representation of an image that is a rectangular image of R rows by C columns wherein the stored representation includes R×C pixel color values, each of which might comprise three or more component color values. An image might be computer-generated from a scene description that describes virtual objects, lighting, effects, a camera position, a camera orientation, a camera viewing frame, etc. in a three-dimensional (3D) virtual space. An image generator, such as a renderer, might compute pixel color values based on which objects are intersected by rays from the camera position through pixel areas of the camera viewing frame. In an example, a scene description might specify the positions, shapes, texture, colors, etc. of various objects and a renderer could generate an image of what the scene would look like from a specified camera position through a specified camera viewing frame. Such a generated image might not show a far object if that far object is further from the camera position than a near object and both the far object and the near object are intersected by a viewing ray from the camera position through a pixel or pixels of the viewing frame. In some cases, such as where the near object is partially translucent or only covers a portion of a given pixel's area in the generated image, the resulting pixel color value for that given pixel might be a combination of color from the near object and color from the far object that can be partially seen at that given pixel. In a logical representation of an image, a pixel might have a nonzero area and a pixel cone or pyramid might be considered instead of a ray. In the general case, the camera position might be a point located in the 3D virtual scene space, a pixel is an area that is a portion of the camera viewing frame (which would represented as part of the resulting image representing a view from the camera position through the camera viewing frame), and a pixel color value represents color from objects that are within a volume swept out by rays that pass from the camera position through points within the pixel area. Thus, a pixel color value might be determined by sampling several rays through the pixel area, or determining what virtual objects are present, or partly present, within the swept-out volume.

An image management system, as might be part of an animation creation system, might generate the pixel array with more information per pixel than just an ultimate pixel color value that might be displayed for a given pixel. A "deep image" might refer to a stored representation of an image that includes pixel color values for different depths of a pixel where the data structure used to represent pixel color values (and possibly other details) for different depths of that pixel might be referred to as a "deep pixel" data structure. With such a deep image representation, instead of just a pixel color value for a pixel area of the camera viewing frame, the deep image representation might include a plurality of pixel color values, with different ones of the plurality representing pixel color values at different depths. In one interpretation, a stored pixel color value, P, for a depth, D, for a pixel at image location (X, Y) might represent a pixel color that would be seen at pixel location (X, Y) in the image but for objects that are intersected by a ray from the camera position through pixel location (X, Y) when those objects are at a depth of less than D. With a stored representation of pixel color values at multiple depths, it might then be a simple matter to appear to "remove" objects from an image.

In an example, consider a scene description where a ray from the camera position through a pixel, $P_1$, or the area thereof, passes through a first opaque object, $O_1$, at a depth $D_1$ and passes through a second opaque object, $O_2$, at a depth $D_2$, where $D_1<D_2$. A simple image would show a pixel of object $O_1$ at pixel $P_1$. A deep image might store color values for both objects and their corresponding depths. From such a deep image, an animator or other image processor or user could specify that objects at depths of $D_3$ or less where $D_1<D_3$ should be removed. An image generation system has enough information to "remove" object $O_1$, which can appear to be done in the image by using the stored pixel color value for $(P_1, D_2)$ instead of the stored pixel color value for $(P_1, D_1)$. As a result, a deep image can be useful when working with images generated from 3D scene descriptions or other 3D representations where changes are desired after the image is generated. In some cases, there might be a need for pixel interpolation before, during, or after other changes. For example, pixel interpolation may be used when resizing an image or transitioning between images.

For pixel interpolation, it might be desirable to avoid introduction of avoidable artifacts. A method and apparatus for managing pixel interpolation of deep pixels in a deep image while retaining structure that allows for easy editing of the deep image is desirable.

SUMMARY

A computer-implemented method for interpolating image data that includes depth information might comprise performing, under the control of one or more computer systems configured with executable instructions, obtaining an image dataset in computer-readable form, wherein image data in the image dataset comprises a plurality of pixel image value arrays, including a first pixel image value array having a first set of pixel image value array samples and a second pixel image value array having a second set of pixel image value array samples, wherein each pixel image value array comprises an association with an associated pixel position and each pixel image value array sample comprises an image value, a depth value, and an association with an associated pixel position, determining a first accumulation curve for the first set of pixel image value array samples and a second accumulation curve for the second set of pixel image value array samples, wherein an accumulation curve represents a cumulative image value as a function of depth of an image value array, determining an interpolated accumulation curve from at least the first accumulation curve and the second accumulation curve, determining an interpolated set of pixel image value array samples from the interpolated accumulation curve and forming therefrom an interpolated image value array, storing the interpolated set of pixel image value array samples as an interpolated deep pixel of an interpolated deep image, and generating a modified image dataset for the interpolated deep image.

The image value might comprise pixel color values, wherein the interpolated set of pixel image value array samples comprise pixel color values, and wherein the image dataset and the modified image dataset comprise pixel color values for pixels over an image. A first sample of the first pixel image value array might have a first depth range and a second sample of the second pixel image value array has a second depth range, and a processor might perform a method of determining if the first depth range and the second depth range overlap in depth, and if the first depth range and the second depth range overlap in depth: (a) generating a first interpolated sample of the interpolated pixel image value array corresponding to a portion of the first sample for a portion of the first depth range that does not overlap with the second depth range, (b) generating a second interpolated sample of the interpolated pixel image value array corresponding to a portion of the first sample and a portion of the second sample for portions that overlap in the first depth range and the second depth range, and (c) generating a third interpolated sample of the interpolated pixel image value array corresponding to a portion of the second sample for a portion of the second depth range that does not overlap with the first depth range.

The image dataset might comprise data for a two-dimensional pixel array of R rows and C columns, R and C being positive integers, wherein the image data comprises R times C pixel image value arrays, one per pixel, wherein a number of pixel image value array samples in image value arrays may vary, and wherein each pixel image value array sample comprises a pixel color value, an alpha value, a depth value or depth range, and each pixel image value array sample is associated with one of the R times C pixels of the image data.

Each pixel image value array might comprise array samples each having depth information that indicates, for its associated pixel, one or more contributing objects that contribute to a color value of the associated pixel, wherein a contributing object of the one or more contributing objects is represented by a depth or a depth range. The contributing object might be contributing to the first pixel color when a position of the contributing object intersects or is within a ray or volume defined by bounds rays from a camera position through a corresponding pixel.

A method might further comprise parsing pixel samples of input deep pixels based on object identifiers, generating interpolated pixel samples based on object identifiers, whereby a pixel sample value for an interpolated pixel having a particular object identifier is computed from input pixel samples specific to that particular object identifier, and/or truncating the interpolated pixel image value array at a truncation sample representing an object that fully occludes farther objects at a pixel location corresponding to the interpolated image value array.

The methods might be implemented as instructions on a non-transitory computer-readable storage medium that, when executed by at least one processor of a computer system, causes the computer system to carry out one or more steps of some or all the methods above. A computer-readable medium carrying instructions, which when executed by at least one processor of a computer system, might be created that causes the computer system to carry out some or all the methods above.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A deep image might be represented by data corresponding to pixels in image space. The deep image might be generated from virtual objects described in a scene space and then by rendering, or otherwise, is represented in an image dataset that might specify, for example, for each pixel in a pixel array, a pixel image value array. Each entry in the pixel image value array might comprise a respective pixel color value, an optional respective alpha value, a respective depth value or a respective depth range, and a respective object identifier identifying which object contributes that color/alpha at the specified depth. The pixel image value array might be associated with a particular pixel by an explicit reference to an associated pixel position or the particular pixel might be determinable by a position of the pixel image value array within the image dataset.

In a specific example, a scene description might describe tree objects in a forest of trees. An image dataset might be provided to an animator that is a deep image of that scene, rendered into a deep image. The animator might specify which trees are to be removed from the scene as a running character is added into the scene. With each object's contribution to a pixel color value provided by the deep image dataset, removing some trees can be done by searching the image dataset for pixel image value array entries that have object identifiers, over all the pixel image value arrays, equal to the object identifiers of the trees to be removed. Entries can be added of the character to the pixel image value arrays of pixels intersected by the character at the depth of the character in the scene. Within in an image there might be thousands of array samples for a given pixel (or there could be as low as zero samples for some pixels).

An interpolation might be desired and the interpolation might occur in an image generation pipeline prior to a point where it is known what will be done with a deep image. Therefore, it would be useful to be able to maintain structures while interpolating so that a resulting flattened image, representing a particular depth and set of objects included and excluded, would be the same or nearly the same as if an interpolation occurred on a flattened image as it would if the interpolation was done on the deep image and the resulting interpolated deep image is later flattened into an image with, for example, one color vector per pixel.

Figure 1:
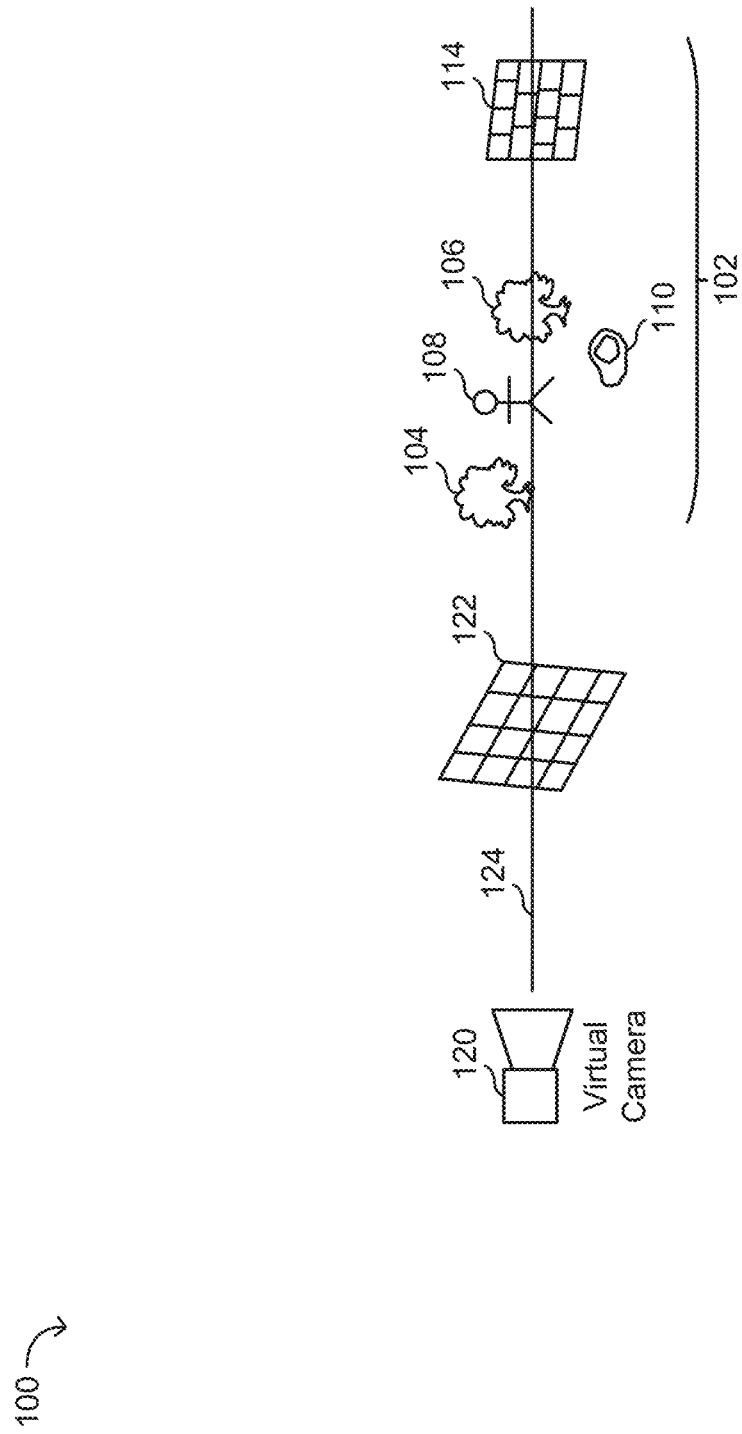
FIG. 1 illustrates a process used to compute deep image data as might represent a virtual scene, in an embodiment.

FIG. 1 illustrates a process used to compute deep image data as might represent a virtual scene, in an embodiment. As illustrated there, capturing 100 of data related to a virtual scene can involve virtual objects 102 placed in a scene space, such as a tree 104, a tree 106, a person 108, a rock 110, and a brick wall 114. To generate an image of the virtual scene, an image-generating computer would compute which virtual objects 102 are visible from a camera 120 at a camera position through pixels of a view frame 122 by computing which objects intersect a ray 124 running from the camera position through a given pixel. For a deep image, rather than just storing a single color value (or color vector in a color space), the deep image might include pixel colors for objects at different depths along ray 124. In this example, where brick wall 114 covers the entire pixel, any objects that are further from the camera than brick wall 114 can be ignored. Alternatively, they might be included in the depth image to provide for the case where brick wall 114 might be moved in editing. In some embodiments, more than one ray is used per pixel and a combination method is used to derive the data for the deep image.

Figure 2:
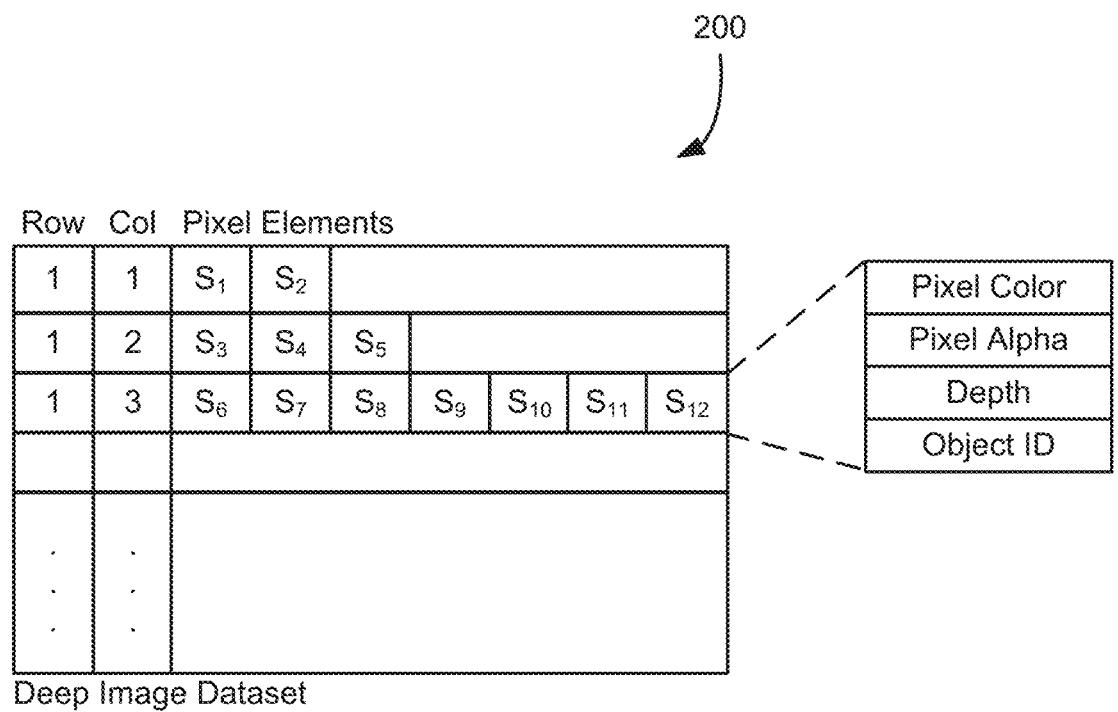
FIG. 2 illustrates a data structure that might be used to store a deep image dataset representing a deep image of a virtual scene, in an embodiment.

FIG. 2 illustrates a data structure that might be used to store a deep image dataset 200 representing a deep image of a virtual scene, in an embodiment. Deep image dataset 200 might include one row per pixel of a deep image, possibly omitting unused pixels. As illustrated, each pixel might be represented by one or more pixel elements, or samples, indicated as $S_1, S_2, \ldots$ in FIG. 2. In that example, the pixel at location (1, 1) in the image has an array comprising two pixel elements, the pixel at location (1, 2) in the image has an array comprising three pixel elements, and the pixel at location (1, 3) in the image has an array comprising seven pixel elements. Each pixel element might contain data indicating a pixel color (which could be a single value, three values, or some other representation of a pixel color value), a pixel alpha (which might range from 0.0 to 1.0 to indicate a degree of transparency), a depth representing a distance from a camera position to an object that is contributing color to that pixel, and an object identifier identifying that object. While the contributions of objects in these examples are pixel colors, it may be that other attributes of objects are used instead of, or in addition to, color. The length of a pixel image value array might be one or more pixel image value array entries, each having an image value, a depth value, and an association with an associated pixel position. The pixel position might be explicit, as illustrated in the data structure of FIG. 2, or might be implied by the data structure used to store the pixel image value arrays.

Figure 3:
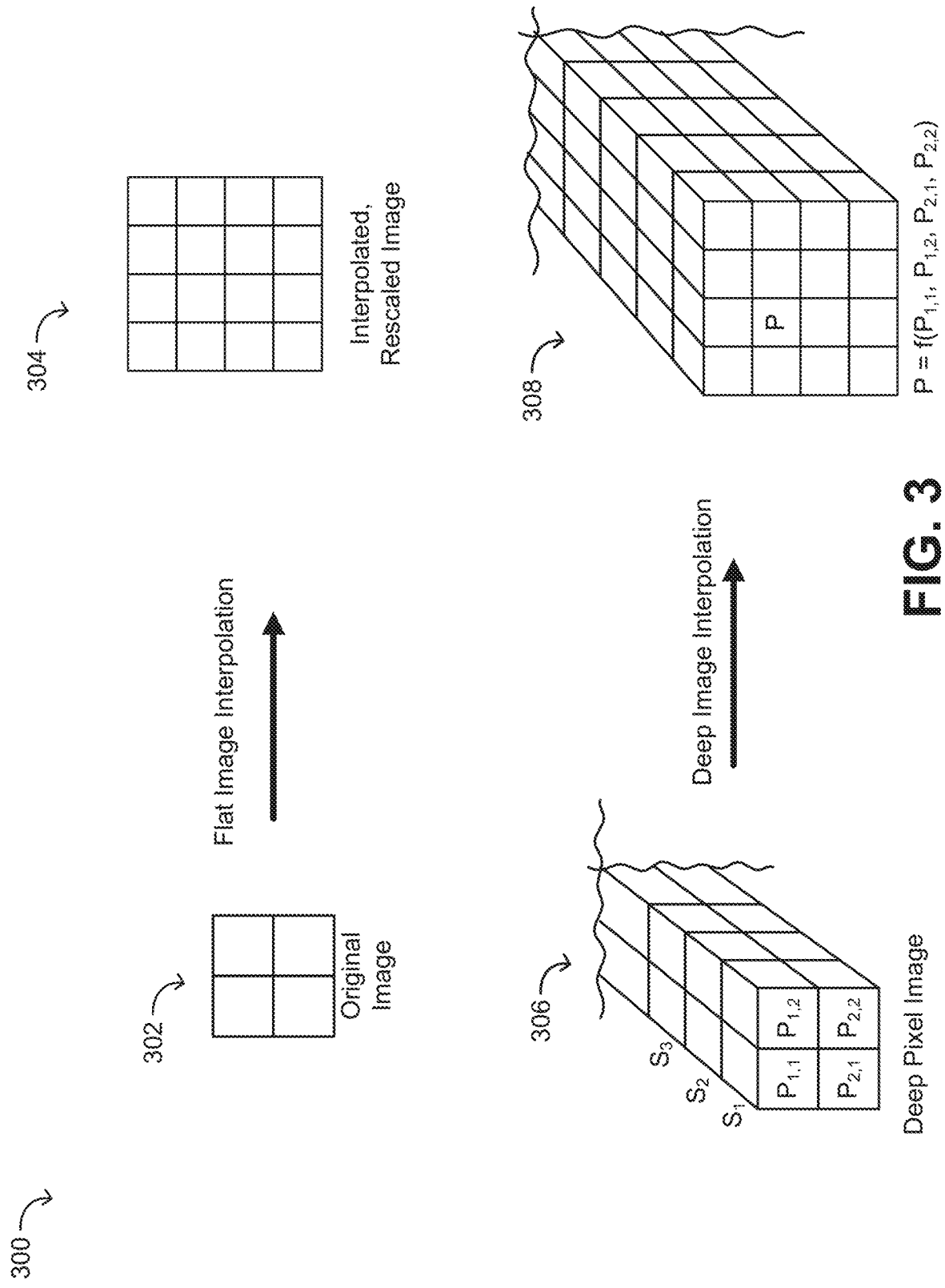
FIG. 3 illustrates an example of interpolation of a flat image and of a deep image, in an embodiment.

FIG. 3 illustrates an example 300 of interpolation of a flat image and of a deep image, in an embodiment. In an example shown there, an image representation 302 might comprise four pixels of an image without any depth or multiplicity of objects or values at each pixel. Image representation 302 can be used to generate an interpolated and scaled image representation 304 comprising sixteen pixels. Some conventional pixel interpolation might be used (e.g., bilinear or bicubic interpolation, spline interpolation, etc.). Also shown is an image representation 306 of a deep pixel image. In image representation 306, a pixel might be represented by a pixel image value array. For example, a pixel image value array $P_{1,1}$ might include a plurality of samples for objects that intersect a ray associated with pixel $P_{1,1}$. A sample might include data elements such as pixel color, depth, transparency, object ID of an object contributing to color, etc. In a specific example, a pixel array might comprise pixel samples $S_1$, $S_2$, and $S_3$. Editing an image might comprise removing samples that are associated with a particular object ID, adding in other objects, etc.

FIG. 3 also shows an image representation 308 that corresponds to an interpolated deep image. In the case of image representation 308, an interpolated deep pixel P might be represented by a pixel image value array having samples that are computed as functions of nearby deep pixels, as well as possibly having global variable values that relate to the pixel image value array as a whole. If image representation 306 includes deep pixels $P_{1,1}$, $P_{1,2}$, $P_{2,1}$, and $P_{2,2}$, values of samples and array global values for interpolated deep pixel P might be some function f ($P_{1,1}$, $P_{1,2}$, $P_{2,1}$, $P_{2,2}$) of those.

In combining two deep pixels according to some function, the function can be applied to the accumulation image value curves rather than the samples. The resulting samples can then be reconstructed from the interpolated image value curve. Where there are apparent discontinuities in an accumulation image value curve due to a zero-depth sample, the sample can be treated as having some small depth range, or discontinuities can be separately handled in an interpolation process. Scaling can be performed on individual deep pixels in a pixel array, but scaling can also be done on accumulation image value curves.

An image processor might receive an image represented by an image dataset that comprises a plurality of deep pixels represented by image value arrays. An image value array might have a plurality of pixel samples, where the image value array is associated with a pixel position and each pixel sample is represented by a data structure having a depth or depth range (such as a beginning depth and an ending depth, or a single depth value), and an image value, which might be a data structure representing one or more pixel colors, one or more transparency values, and an object identifier indicating which of a plurality of virtual or real objects in a scene contributes or contributed the pixel colors, transparency, etc. of the pixel sample. If the image processor is to generate a flat image corresponding to some designated depth, it might generate pixel color values by starting at the designated depth and accumulating image values, such as color and transparency, along the pixel samples of the image value array in depth order. Accumulation might be done from near depth to far depth of from far depth to near depth. Accumulation might omit processing of samples of hidden objects. For example, if a deep pixel includes samples from a first object that is opaque, completely spans the area of a pixel at a particular depth and includes samples of a second object that is further away than the particular depth, the pixel samples of the second object might be omitted, skipped, or deferred in pixel sample processing.

An accumulation curve can be visualized as a curve, which might or might not be a piecewise linear curve stored in memory as an ordered series of vertices. Interpolation of two or more input deep pixels to form an interpolated pixel might comprise computing a function of input accumulation curves, the accumulation curves of the input deep pixels from which the interpolated deep pixel is being formed. An accumulation curve might be displayed as a plot of a change in image data versus depth. A function that generates an interpolated accumulation curve might be an equal weighting of each input accumulation curve or might be an unequal weighting.

Where pixel samples of two or more input deep pixels have overlapping depth ranges, the interpolated deep pixel might have pixel samples for overlapping depth ranges and for nonoverlapping depth ranges. For example, suppose a first input deep pixel $P_1$ has a pixel sample $S_{1,a}$, with a beginning depth of $D_1$ and an ending depth of $D_2$, and a second input deep pixel $P_2$ has a pixel sample $S_{2,f}$ with a beginning depth of $D_3$ and an ending depth of $D_4$, where $D_1 < D_3 < D_2 < D_4$. An interpolated deep pixel, $P_3$, that is an interpolation of $P_1$ and $P_2$ might have a first pixel sample, $S_{3,a}$, that has a contribution from $P_1$ with a depth range of $D_1$ to $D_3$, a second pixel sample, $S_{3,b}$, that is an interpolation of $P_1$ and $P_2$ with a depth range of $D_3$ to $D_2$, and a third pixel sample, $S_{3,c}$, that has a contribution from $P_2$ with a depth range of $D_2$ to $D_4$. In some cases, there might be more pixel samples in an interpolated pixel than the sum of the pixel samples in the input deep pixels that the interpolated pixel interpolates for.

Figure 4:
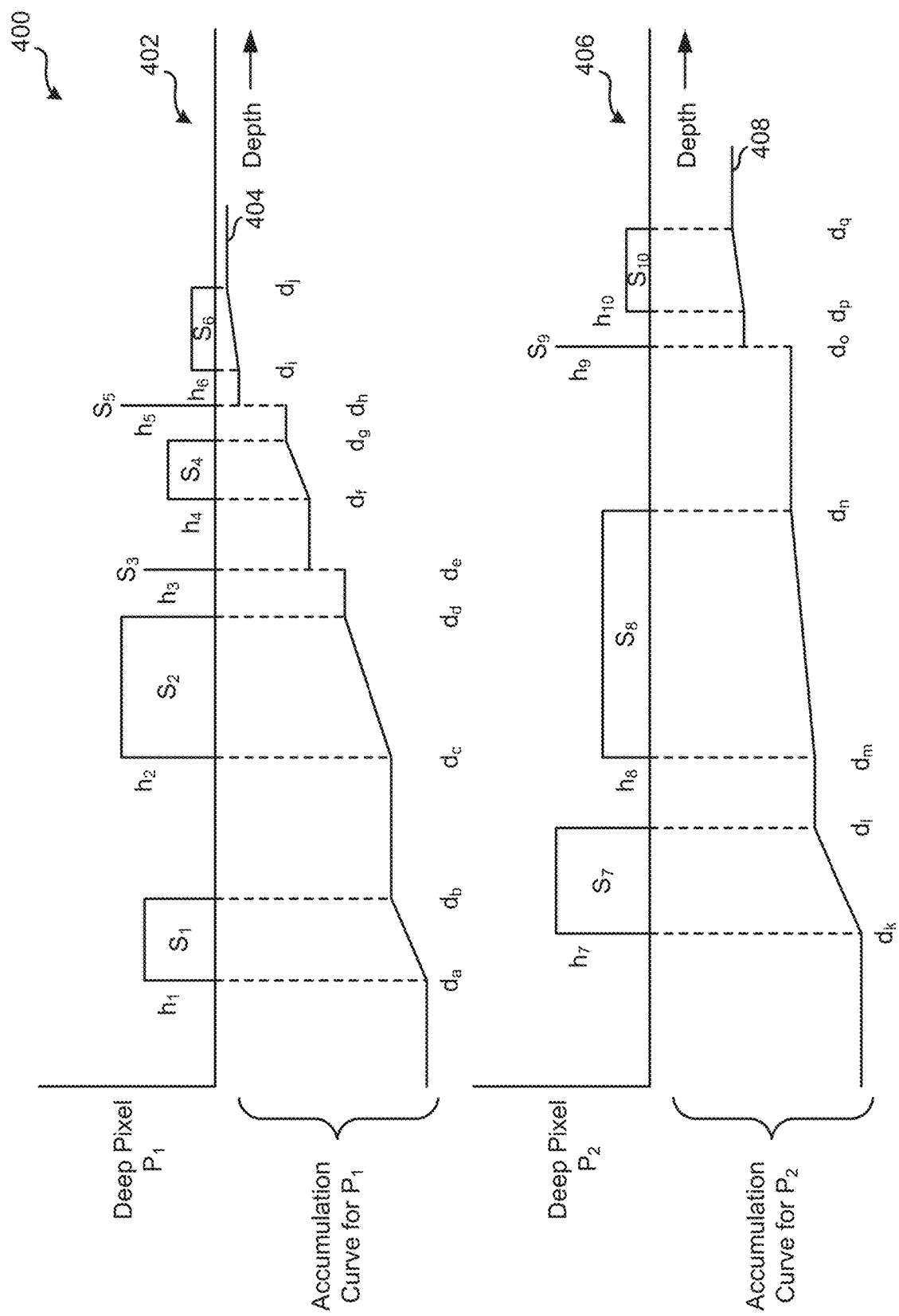
FIG. 4 illustrates representations of pixel color values as a function of depth for example pixels and accumulation curves for those pixels and for a resulting interpolated pixel, in an embodiment.

A pixel value array might comprise samples having depth ranges such that there are some depth ranges not covered by any sample, as in FIG. 4. Those depth ranges might correspond to portions of a scene that have no objects that intersect the volume swept by a pixel. The data structure that stores a pixel value array might not include data to represent those empty depth ranges. When an image process converts from a pixel value array to an accumulation curve or vice versa, those empty depth ranges might be represented in an accumulation curve as a horizontal line segment.

FIG. 4 illustrates representations 400 of pixel image values (which might be color values) as a function of depth for example pixels and accumulation curves. A deep pixel $P_1$ 402 might have a plurality of samples, and might be stored in a data structure illustrated in FIG. 2 or FIG. 3. In FIG. 4, a plot 404 represents an accumulation curve of deep pixel 402, indicative of a value of deep pixel 402 at various depths. As illustrated, samples have starting depths and ending depths, with some samples, such as zero-depth samples $S_3$ and $S_5$ in plot 402, having a single depth, thus representing "thin" samples. The image values might be represented by the height of the samples and those image values might be color component values, in which case there might be multiple such plots per deep pixel. As illustrated, each of the samples has a height, which might refer to a saturation value or some other sample value.

When stored in memory or being processed as data, a deep pixel might be represented as an array of samples, wherein each sample is in turn represented by a height, a starting depth, an ending depth, and possible also an object ID, among other fields. In the case of thin samples, the starting depth and the ending depth are the same value, so a processor could determine which samples are thin samples and which are non-thin (thick) samples based on whether the starting and ending depths are equal. Alternatively, a field might be stored that indicates whether a sample is thick or thin.

An accumulation image value curve 404 is illustrated for deep pixel $P_1$ 402, which represents a sum of effects of the image value up to a given depth for those samples. For example, where the accumulation is front to back, it might start at zero and go up at each sample, remain constant between samples and reach a maximum at some depth. For thin samples, there is a discontinuity of the curve at the depth of the thin samples, with the discontinuity corresponding to the height of the thin sample. Where accumulation image value curve 404 is represented in memory or processed as data, it might be represented by a table indicating depths at which salient events occur (the start of a thick sample, the end of a thick sample, the depth of a thin sample, etc.). In the example shown in FIG. 4, those depths are $d_a$, $d_b$, $d_c$, $d_d$, $d_e$, $d_f$, $d_g$, $d_h$, $d_i$, and $d_j$. In another variation, accumulation is done from front to back, in which case the accumulation curve might look like a negative of that shown in FIG. 4. The table representing the curve illustrated might include rows with depth values and for each depth value, a slope to the next salient depth value (or a height, in the case of a thin sample). A slope value in the table between two depth values might be equal to the height of a sample between those two depth values divided by the difference in depth values (which would be the "thickness" of a sample, and the slope would be zero between samples.

FIG. 4 also illustrates a second deep pixel, deep pixel 406 having thick samples $S_7$, $S_8$, and $S_{10}$ and thin sample $S_9$, and its corresponding accumulation image value curve 408. In some deep pixel representations, samples might abut, so that they share an edge.

Figure 5:
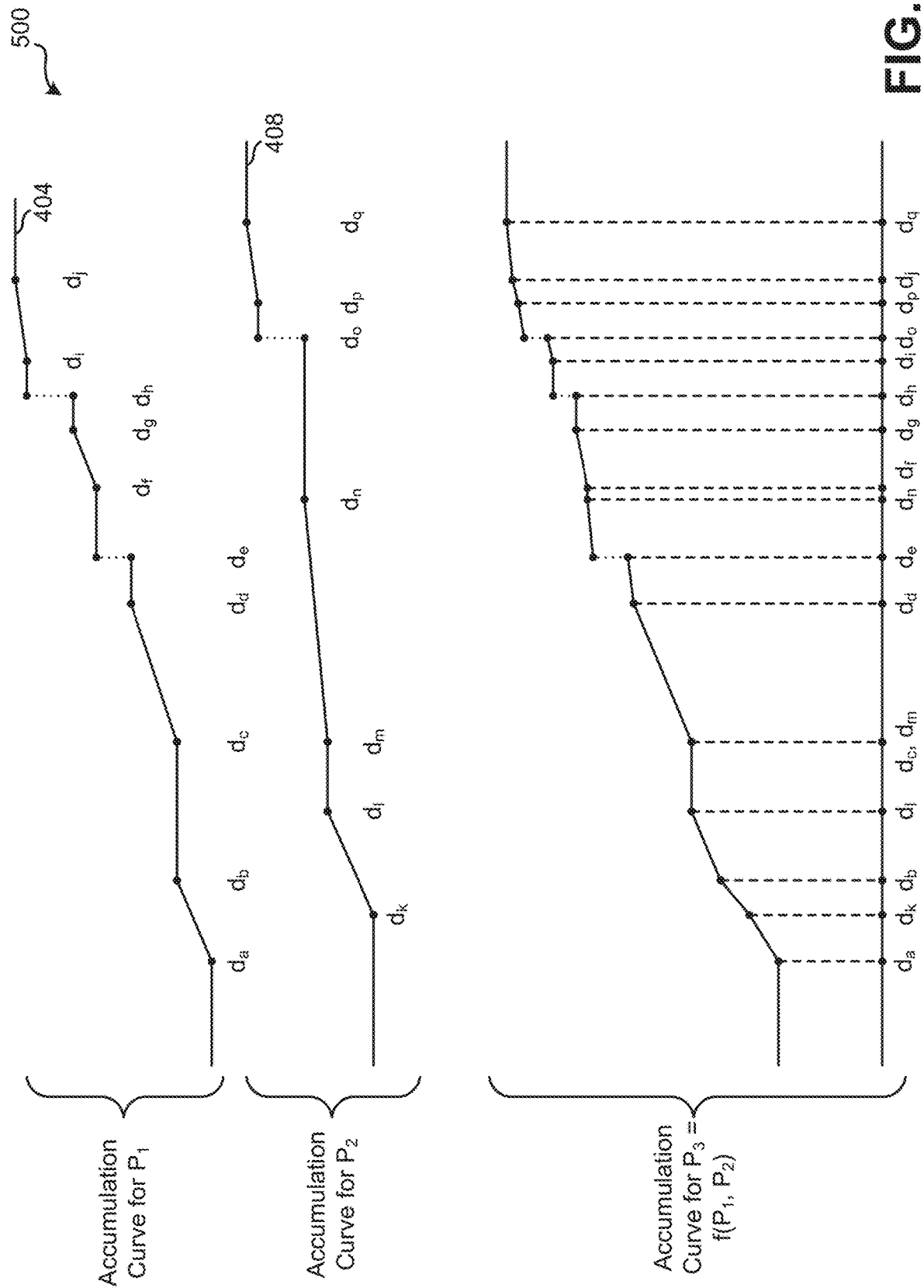
FIG. 5 illustrates representations of an interpolation of deep pixels from their respective accumulation curves, as a combiner might use to generate an interpolated pixel accumulation curve from input pixel accumulation curves, in an embodiment.

FIG. 5 illustrates a data structures 500 that a combiner might use to generate an interpolated pixel accumulation curve from input pixel accumulation curves. In a combining process, the salient points of each of the deep pixels can be considered. Under some conditions, not all of the salient points need be considered, but in the example illustrated by FIG. 5, they are. As shown, an accumulation curve for an interpolated pixel can be determined from the accumulation curves of the input deep pixels. This can be done from the data structure or table that represent the curves for the input deep pixels illustrated, by considering the depths and the individual slopes of the curves. Note that the depth values in the accumulation curve correspond to each change in either of the input pixels, so there are often more salient depths than in one of the input deep pixel's accumulation curve. Note that each of the thin samples, which create a discontinuity in their respective curves, results in a discontinuity in the interpolated curve. In the specific example of FIG. 5, the interpolation function used for the illustration—$P_3=f(P_1, P_2)$—is $f(x, y)=(x+y)/2$, but other interpolation functions might be used instead.

As illustrated in FIGS. 4 and 5, the accumulation curve portion under a sample rises linearly over the sample, with a slope that corresponds to the height of the sample. In some implementations, other variations are possible, such as where the Y-axis scales are logarithmic. The increase in the accumulation curve over the thickness of a sample might be an exponential curve, such as one where it rises exponentially according to the Beer-Lambert law, in which case exponential rises might be depicted as linear slopes. Other interpolation schemes might be used and might depend on the type of volumetric object being depicted (e.g., fog, smoke, water). In some instances where a sample is approximating motion-blurred objects moving towards a camera, the linear slope might be more accurate. A data structure storing a deep pixel might include a field to indicate, perhaps on a per-sample basis, which kind of interpolation to use and a field to indicate how to treat the changing accumulation value across the depth thickness of the sample. Thus, the accumulation curves may be shown drawn as linear slopes in the figures, indicating that the values increase linearly throughout each sample, but other interpolation functions are possible and might be depicted differently. Individual samples could be tagged to indicate their preferred interpolation function, or an entire deep pixel or image might be tagged to indicate the interpolation function to use for all of that deep pixel or image. Some interpolation functions might employ additional per-sample values to shape the interpolation curve accordingly.

In a specific embodiment, an interpolation method might be used to determine and output an interpolated output pixel, such as a single output pixel, from one or more input pixels the interpolated pixel interpolates for.

In such a method, a weight is determined for each input pixel. There are a number of ways this might be done, such as equally weighting, weighting by distance metric from an interpolation target point, normalizing, or not. In effect, the output pixel is deep pixel that is a weighted blend of each of the input pixels, which are also deep pixels. A representation in memory of a deep pixel might comprise a list of samples, each sample having a front depth value and a back depth value. The sample values at various depths might represent color contributions of particular objects. For example, a sample value in a list of samples might be a data structure that has values for a front depth, a back depth, a color, an object that contributes that color, and other data and/or metadata.

In some cases, a sample's front depth value and back depth value are equal, indicating a sample for an object that has zero depth. Such a sample might be referred to as a "thin" samples, whereas a sample having a nonzero depth extent in a deep pixel might be referred to as a "thick" sample.

In a first step, a processor might compile an interim depth list that includes all the front depths and back depths of all of the samples of all of the input pixels to be interpolated (or less than all if, for some reason, some samples are not being considered). The interim depth list can exclude all samples of a given input pixel that have depths greater than a sample that has an alpha value of greater than or equal to one, corresponding to what is considered a solid sample.

In a second step, the processor might search for the thin samples in the input pixels and tags their corresponding depths in the interim depth list as being related to thin samples.

In a third step, the processor derives an accumulation curve for each input pixel separately. An accumulation curve for an input pixel might be a piecewise linear (or nonlinear) curve based on the samples of the input pixel. For each depth, z, in the list of samples for the input pixel, the processor can compute an accumulated value of the input pixel at that depth. Thin samples can be processed twice, once as a "front iteration" and once as a "back iteration." The value at depth z is inserted into the accumulated curve with the two values obtained.

One approach to computing an accumulation curve's value at depth z might comprise compositing together all samples that start before depth z and end at, or before, depth z, possibly using an "Over" operator. For a sample that begins before depth z and ends after depth z, the processor might compute a partial sample value using some method, such as computing them using Beer-Lambert's rules. For a thin sample that begins and ends at depth z, the compositing includes it during a back-to-front iteration, wherein an accumulation curve is sample values accumulated from furthest depth to nearest depth, but not in a front-to-back iteration, wherein an accumulation curve is sample values accumulated from nearest depth to furthest depth. Samples that begin after depth z need not be processed.

In a fourth step, the processor might compute a combined interpolated accumulation curve wherein each entry in the combined interpolated accumulation curve is a weighted sum of the corresponding entries of the input pixel accumulation curves, weighted by the determined weights.

In some embodiments, an optional step of applying a compression function on the combined interpolated accumulation curve is performed to generate a new combined interpolated accumulation curve that contains no more samples than any of the individual input pixels.

In a next step, the combined interpolated accumulation curve is processed to de-accumulate output samples from the accumulated list to form an interpolated samples list. This can be done from the front to back or back to front. If from front to back, the front of a sample, n, will begin at an entry, n, in the depth list and will ends at depth n+1. In the case of a thin sample, these would be the same value and the interpolated samples list would include a thin sample. The color and alpha values (or other image values) for the n-th sample, Color[n], might be computed from the combined interpolated accumulation curve such that Equations 1 and 2 are satisfied, wherein accum_curve[ ] is an array of accumulation curve values (which might be color values) of a pixel and accum_alpha[ ] relates to transparency.

$$\text{Color}[0] = \text{accum\_color}[0] \qquad \text{(Eqn. 1)}$$

$$\text{Color}[n] = (\text{accum\_color}[n] - \text{accum\_color}[n-1])/(1 - \text{accum\_alpha}[n-1]) \qquad \text{(Eqn. 2)}$$

In a specific embodiment, Color[ ] is an array of vectors representing the output red, green, blue component values and alpha values for each sample as computed above. In an embodiment, the array accum_alpha[ ] includes only the alpha components of the elements of accum_color[ ], where accum_color[i] is equal to the alpha component of the color vector accum_color[i]. There could be more or fewer components, such as different layers of colors, or perhaps non-color information that could treated as if it were color for the purposes of pixel interpolation.

In a further step, the processor might prune the output pixel to remove output samples that have zero values. The output pixel can then be output and/or stored as a deep pixel comprising one or more samples on a list of samples.

Figure 6:
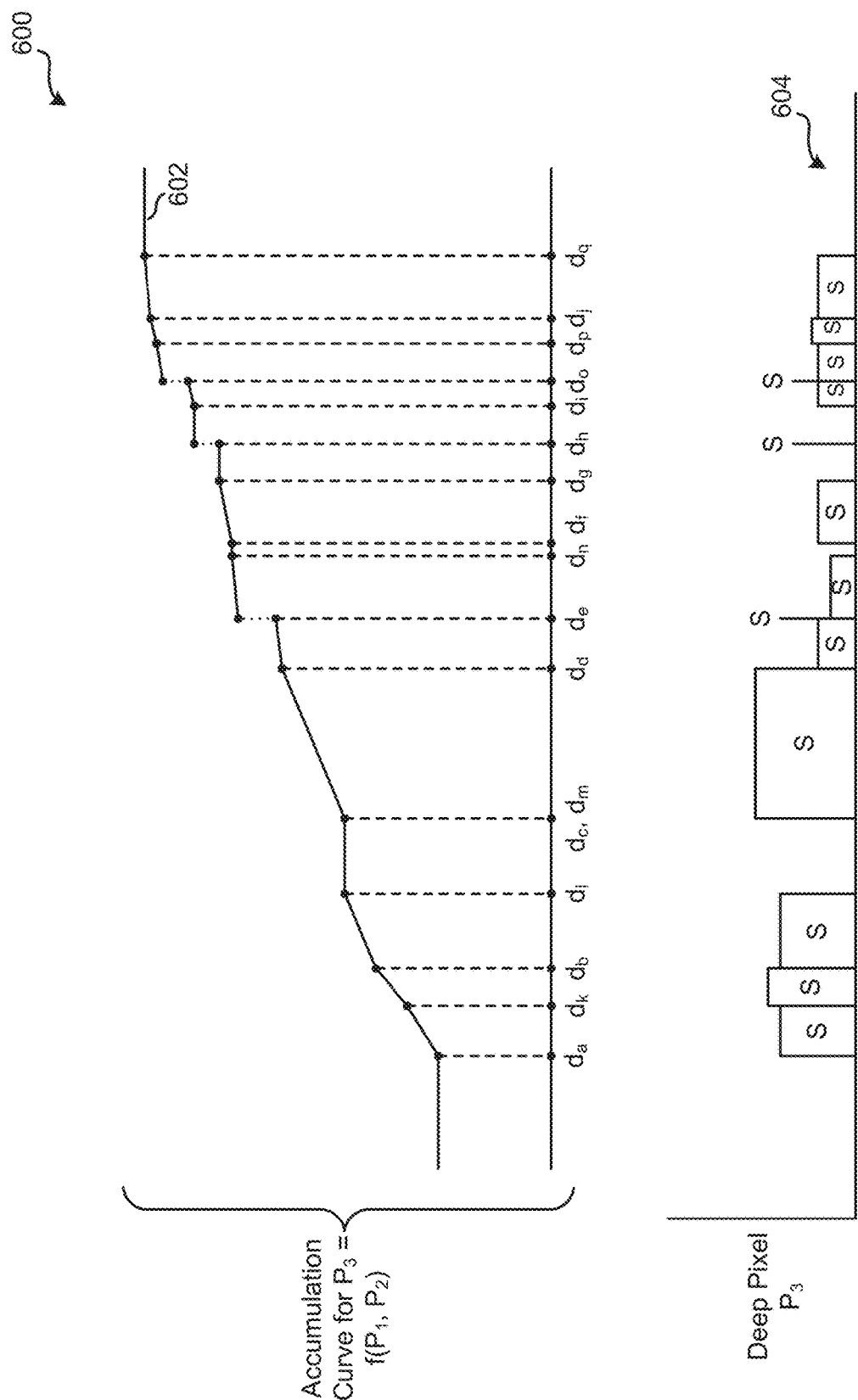
FIG. 6 illustrates a process for generating a deep pixel sample array from an interpolation accumulation curve, converting from an interpolated pixel accumulation curve to an interpolated deep pixel, in an embodiment.

FIG. 6 illustrates a process 600 for converting from an interpolated pixel accumulation curve 602 to an interpolated deep pixel 604. Between each salient depth point and the next, a slope is determined (or a jump corresponding to effects of a thin sample on the interpolation), and a corresponding sample is generated. A corresponding sample might be a sample with a depth range from one salient depth point to another and a height that is proportional to the slope times the difference in depths.

Figure 7:
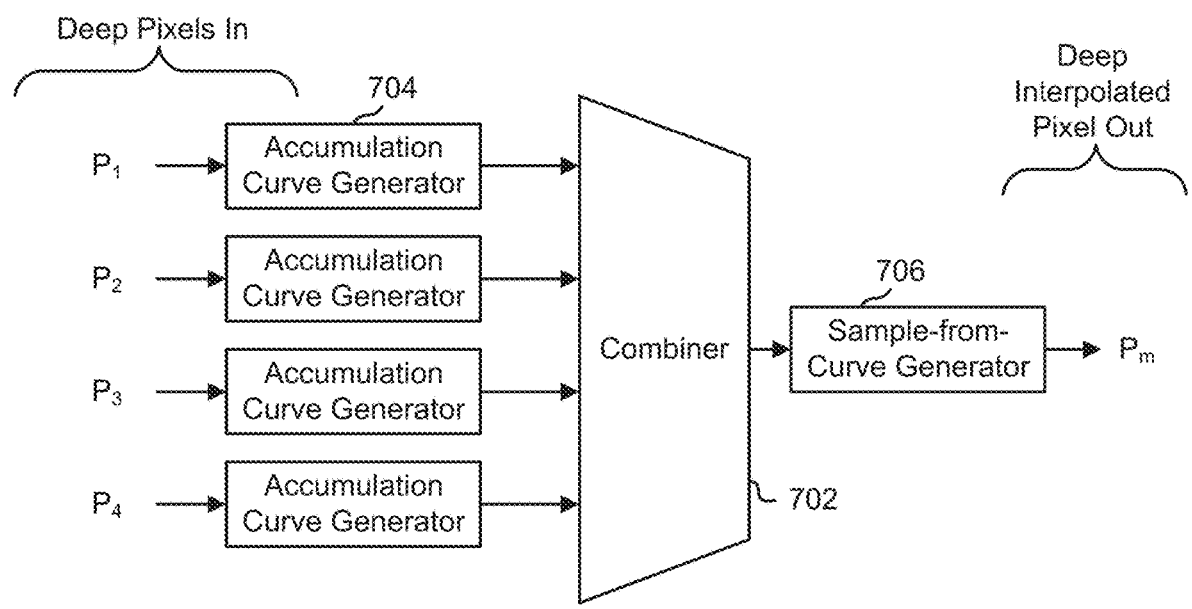
FIG. 7 illustrates a hardware and/or software module that generates an interpolated deep pixel from a combination of a plurality of input deep pixels, in an embodiment.

FIG. 7 illustrates a hardware and/or software module that generates an interpolated deep pixel from a combination of a plurality of input deep pixels, in an embodiment. As shown there, accumulation curve generators 704 generate accumulation curves from some input deep pixels $P_1$, $P_2$, $P_3$, and $P_4$, perhaps as illustrated in FIG. 4. A combiner 702 combine those curves, perhaps as illustrated in FIG. 5, and a sampler-from-curve generator 706 might process the output of combiner 702, perhaps as illustrated in FIG. 6, and output an interpolated pixel $P_m = f(P_1, P_2, P_3, P_4)$.

Figure 8:
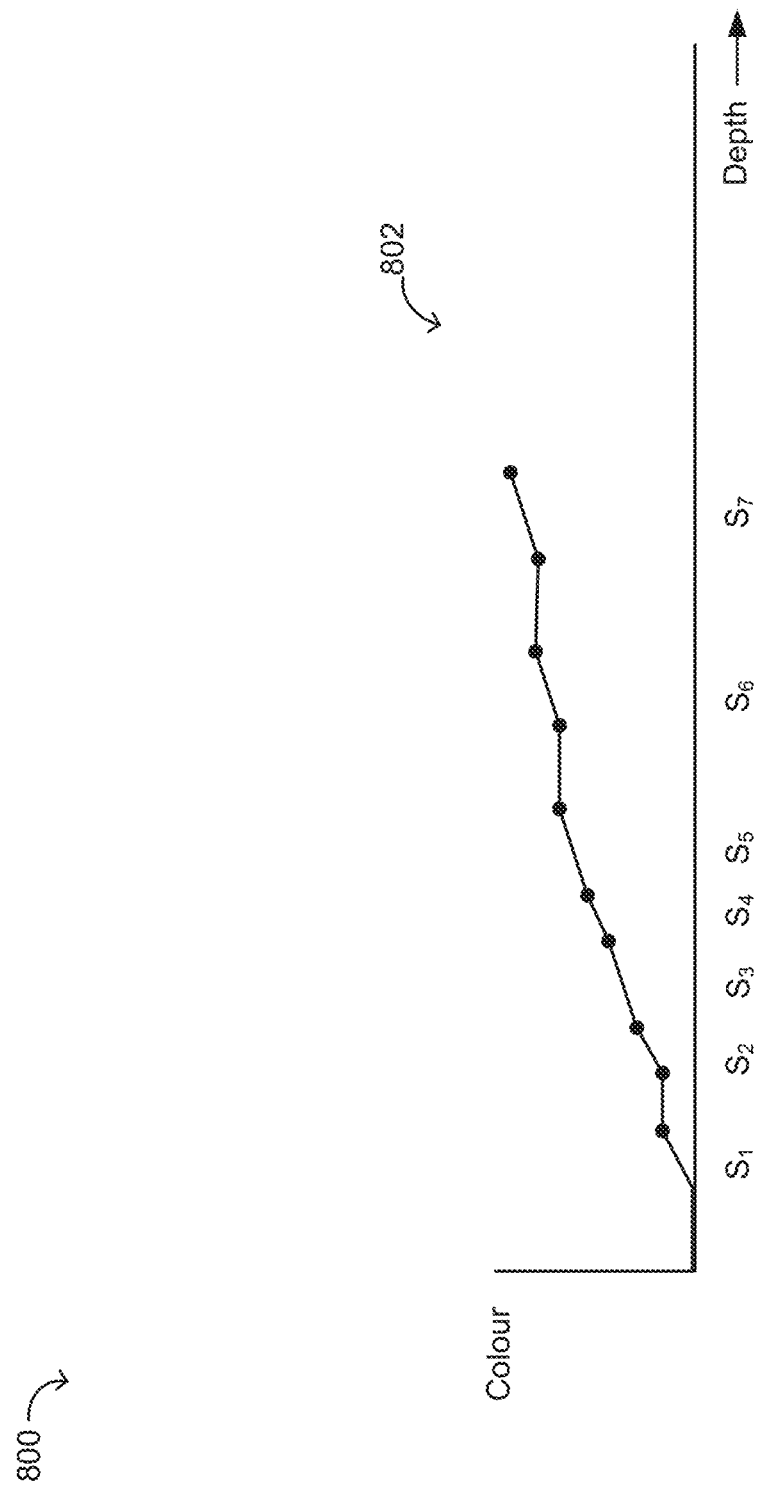
FIG. 8 illustrates an accumulation curve for an interpolated pixel, in an embodiment.

FIG. 8 illustrates another example 800 of accumulation image value curve 802 for an interpolated pixel, in an embodiment. When a particular pixel is to be used, a depth can be selected and from that, a corresponding color value.

Figure 9:
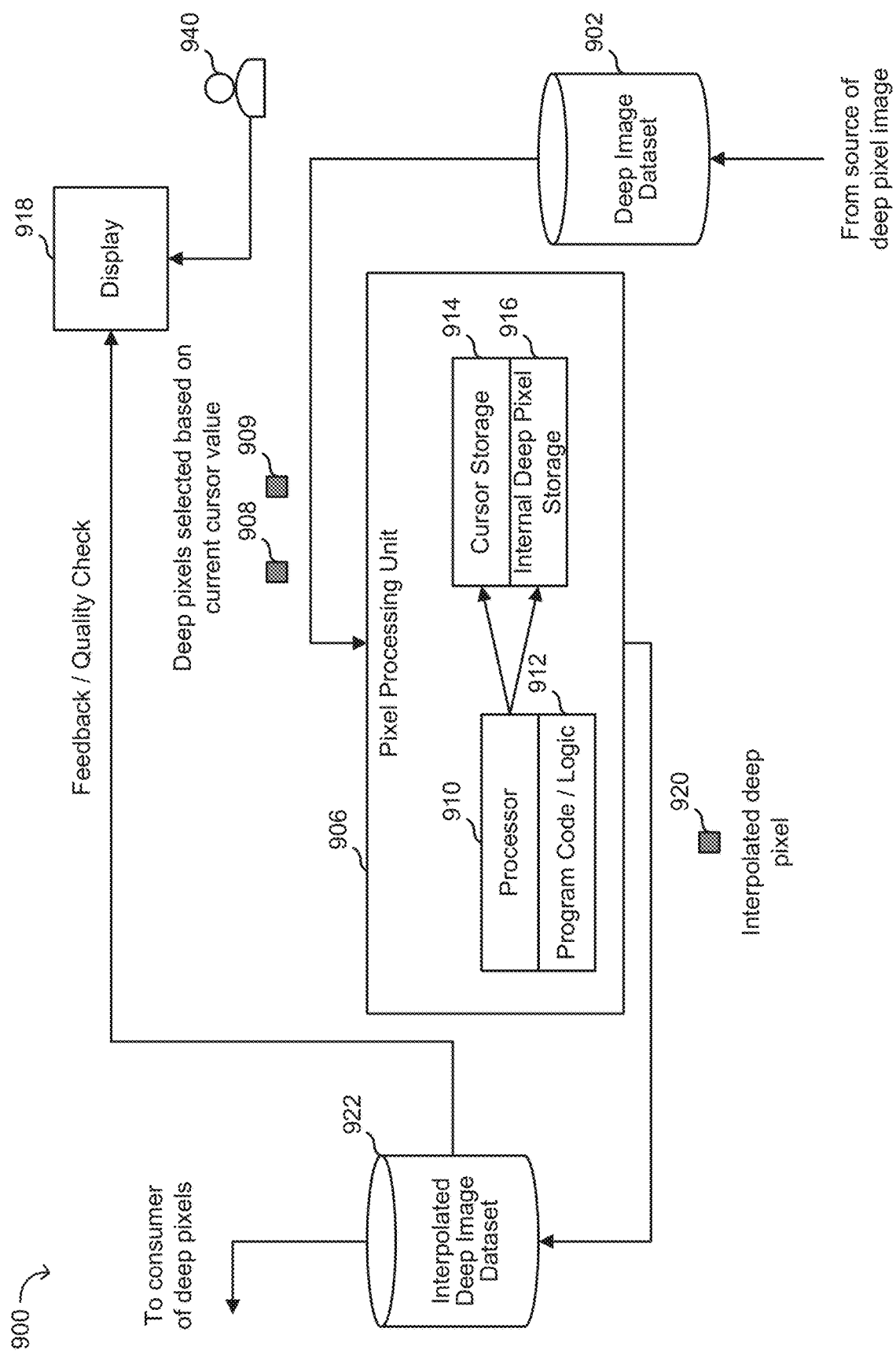
FIG. 9 illustrates a system for performing interpolation of an image dataset of a deep image to form an interpolated deep image dataset of the deep image, in an embodiment.

FIG. 9 illustrates a system 900 for performing interpolation of an image dataset of a deep image to form an interpolated deep image dataset of the deep image, in an embodiment. The system includes a deep image dataset 902, a pixel processing unit 906, a display 918, and an interpolated deep image dataset 922.

The deep image dataset 902 stores image data as a plurality of pixel image value arrays, as illustrated in FIG. 2. The deep image dataset 902 may be loaded with data from a source of a deep pixel image (e.g., a file). Pixel image value arrays may have interpolation performed on them when, for example, the deep image they represent is scaled.

The pixel processing unit 906 may generate an interpolated deep image dataset 922 based on the deep image dataset 902. The pixel processing unit 906 includes a processor 910 that executes program code 912 to generate interpolated deep pixels from the deep pixels in the deep image dataset 902. The pixel processing unit 906 may use a cursor to iterate through deep pixels in the deep image dataset 902. Using the cursor, the pixel processing unit may retrieve deep pixels 908 and 909 from which to generate an interpolated deep pixel 920. For example, the pixel processing unit 906 may initiate the interpolation process by setting the cursor to point to the first pixel in the deep image dataset 902. The pixel processing unit 906 may retrieve the first pixel (e.g., deep pixel 908) and another pixel 909 (e.g., an adjacent deep pixel) to combine data during the interpolation process. As described with respect to FIG. 10, the processor 910 may determine accumulation curves for the image value array samples corresponding to deep pixel 908 and image value array samples corresponding to deep pixel 909. The processor 910 may then determine an interpolated accumulation curve based on the two accumulation curves, and an interpolated set of image value array samples based on the interpolated accumulation curve. The interpolated set of image value array samples may form the interpolated deep pixel 920, which may be stored in the interpolated deep image dataset 922. The processor 910 may use the cursor storage 914 to store information related to the cursor (e.g., position information), and the internal deep pixel storage 916 to store deep-pixel information being processed (e.g., the deep pixels 908 and 909 and the accumulation curves). The pixel processing unit 906 may then move the cursor to the next pixel in the deep image data set and repeat the process until every deep pixel in the deep image dataset has been considered and the interpolated deep image dataset 922 completed. The resulting interpolated image may be presented on the display 918 to allow a user 940 to inspect the results, and the interpolated deep image dataset 922 may be made available to consumers of deep pixels.

Figure 10:
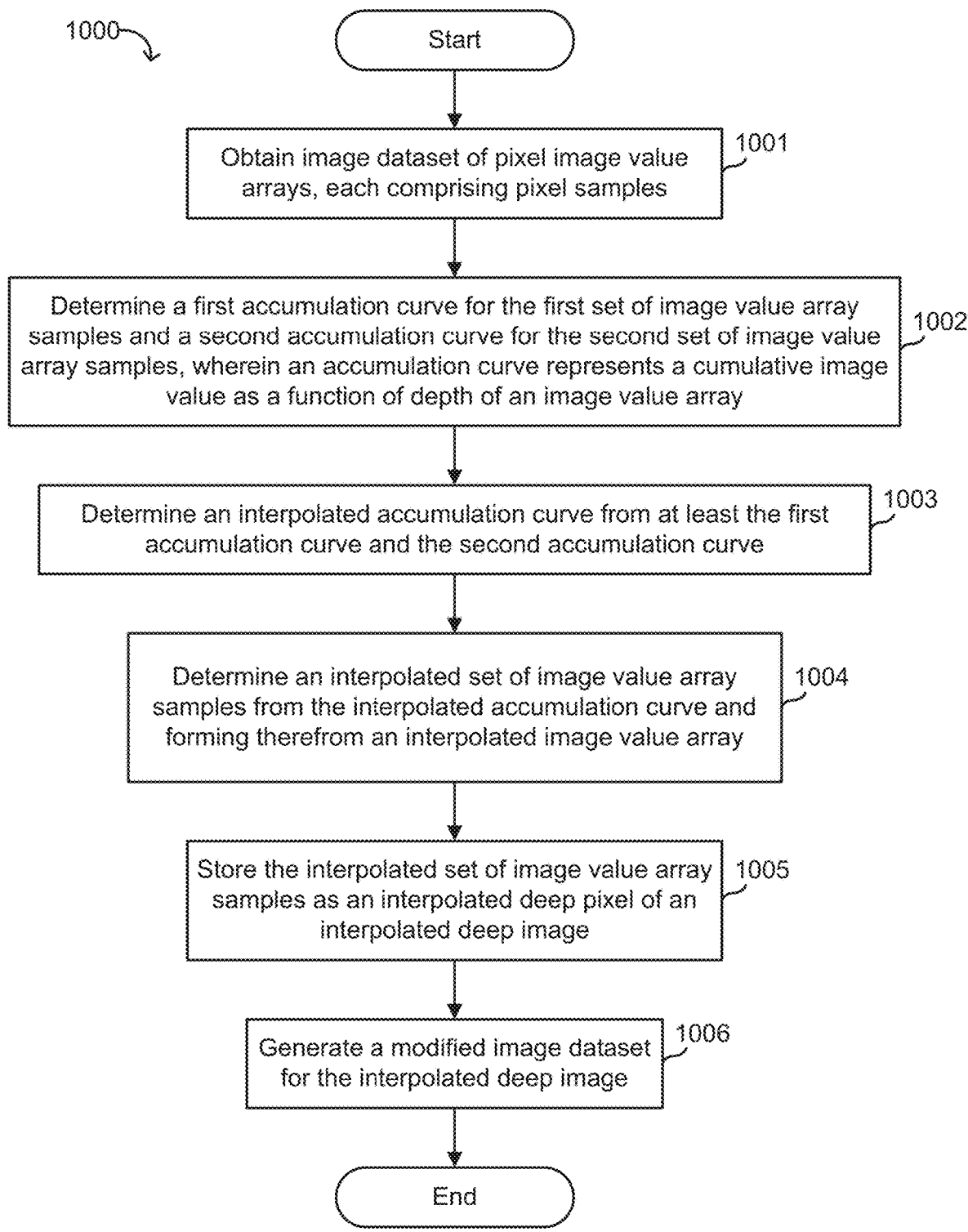
FIG. 10 is a flowchart of an exemplary method as might be performed by an image processor to interpolate deep image data, in an embodiment.

FIG. 10 is a flowchart of an exemplary method 1000 as might be performed by an image processor to interpolate deep image data. Note that one or more of the steps of method 1000 may be combined, omitted, or performed in a different order in different embodiments.

In step 1001, the image processor might obtain an image dataset in computer-readable form. The image data in the image dataset might comprises a plurality of pixel image value arrays, including a first pixel image value array having a first set of image value array samples and a second pixel image value array having a second set of image value array samples.

Each image value array may comprise an association with an associated pixel position and each image value array sample may comprises an image value, a depth value, and an association with an associated pixel position. Each array sample may include depth information indicating one or more contributing objects that contribute to a color value of the associated pixel. A contributing object of the one or more contributing objects may be represented by a depth or a depth range. The contributing object may be contributing to the first pixel color when a position of the contributing object intersects or is within a ray or volume defined by bounds rays from a camera position through a corresponding pixel.

In some embodiments, the image dataset may comprise data for a two-dimensional pixel array of R rows and C columns, R and C being positive integers, wherein the image data comprises R times C pixel image value arrays, one per pixel, wherein a number of image value array samples in image value arrays may vary, and wherein each image value array sample comprises a pixel color value, an alpha value, a depth value or depth range, and each image value array sample is associated with one of the R times C pixels of the image data.

In step 1002, the image processor might determine a first accumulation curve for the first set of image value array samples and a second accumulation curve for the second set of image value array samples. An accumulation curve might represent a cumulative image value as a function of depth of an image value array. The image value may comprise pixel color values, wherein the interpolated set of image value array samples comprise pixel color values, and wherein the image dataset and the modified image dataset comprise pixel color values for pixels over an image.

In step 1003, the image processor might determine an interpolated accumulation curve from at least the first accumulation curve and the second accumulation curve. Each entry in the interpolated accumulation curve may be a weighted sum of the corresponding entries of the first and second accumulation curves.

In step 1004, the image processor might determine an interpolated set of image value array samples from the interpolated accumulation curve and form an interpolated image value array from the interpolated accumulation curve. In some embodiments, a first sample of the first pixel image value array may have a first depth range and a second sample of the second pixel image value array may have a second depth range. If the first and second depth ranges overlap, the image processor may generate a first interpolated sample of the interpolated image value array corresponding to a portion of the first sample for a portion of the first depth range that does not overlap with the second depth range, generate a second interpolated sample of the interpolated image value array corresponding to a portion of the first sample and a portion of the second sample for portions that overlap in the first depth range and the second depth range, and/or generate a third interpolated sample of the interpolated image value array corresponding to a portion of the second sample for a portion of the second depth range that does not overlap with the first depth range.

In some embodiments, the image processor might parse pixel samples of input deep pixels based on object identifiers and generate interpolated pixel samples based on object identifiers. A pixel sample value for an interpolated pixel having a particular object identifier may be computed from input pixel samples specific to that particular object identifier.

In step 1005, the image processor might store the interpolated set of image value array samples as an interpolated deep pixel of an interpolated deep image. In some embodiments, the interpolated deep pixel may be truncated at a truncation sample representing an object that fully occludes farther objects at a pixel location corresponding to the interpolated deep pixel.

In step 1006, the image processor might generate a modified image dataset for the interpolated deep image.

Figure 11:
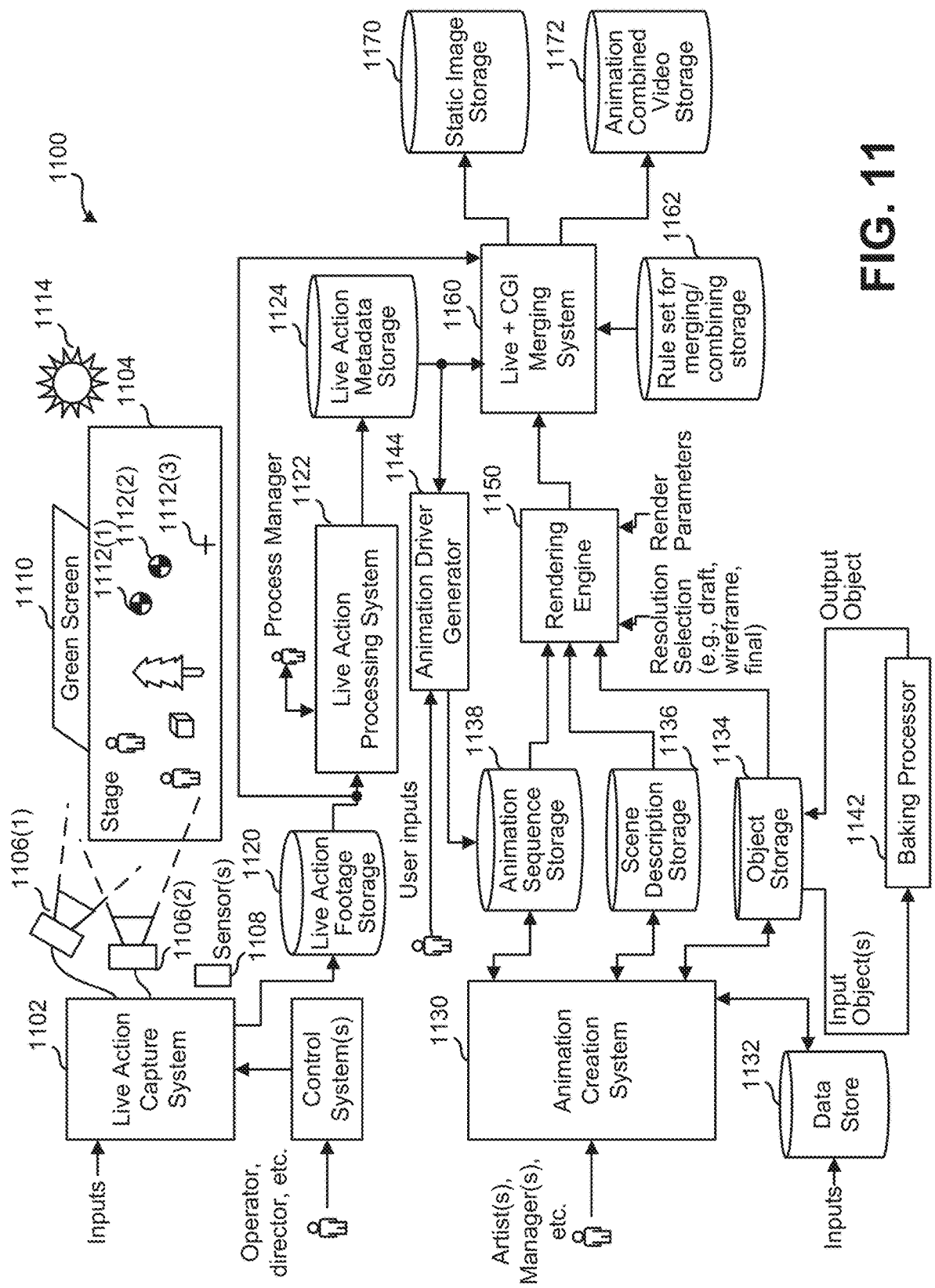
FIG. 11 illustrates an example visual content generation system as might be used to generate imagery in the form of still images and/or video sequences of images, according to various embodiments.
Figure 12:
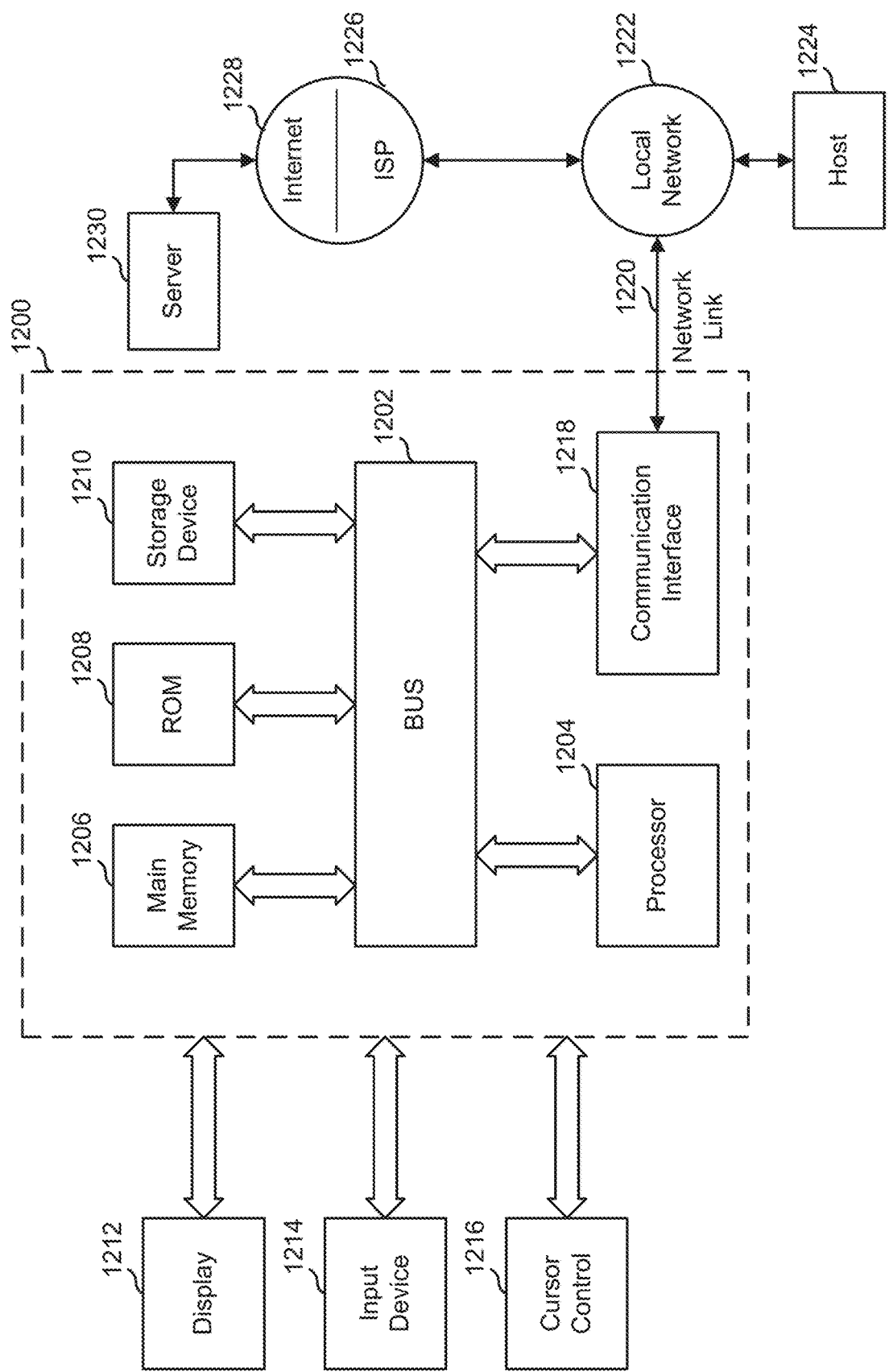
FIG. 12 is a block diagram illustrating an example computer system upon which computer systems of the systems illustrated in FIGS. 1 and 11 may be implemented.

Visual content generation system 1100 (see FIG. 11) can be configured to generate and process deep images and may be implemented by software executing on one or more computer systems (e.g., each like a computer system 1200 illustrated in FIG. 12).

For example, FIG. 11 illustrates the example visual content generation system 1100 as might be used to generate imagery in the form of still images and/or video sequences of images. Visual content generation system 1100 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 1100 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1100 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 11, a live action capture system 1102 captures a live scene that plays out on a stage 1104. Live action capture system 1102 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1106(1) and 1106(2) capture the scene, while in some systems, there might be other sensor(s) 1108 that capture information from the live scene (e.g., infrared cameras, infrared sensors, motion capture ("mo-cap") detectors, etc.). On stage 1104, there might be human actors, animal actors, inanimate objects, background objects, and possibly an object such as a green screen 1110 that is designed to be captured in a live scene recording in such a way that it is easily overlaid with computer-generated imagery. Stage 1104 might also contain objects that serve as fiducials, such as fiducials 1112(1)-(3), that might be used post-capture to determine where an object was during capture. A live action scene might be illuminated by one or more lights, such as an overhead light 1114.

During or following the capture of a live action scene, live action capture system 1102 might output live action footage to a live action footage storage 1120. A live action processing system 1122 might process live action footage to generate data about that live action footage and store that data into a live action metadata storage 1124. Live action processing system 1122 might include computer processing capabilities, image processing capabilities, one or more processors, program code storage for storing program instructions executable by the one or more processors, as well as user input devices and user output devices, not all of which are shown. Live action processing system 1122 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1114, as that might be useful in post-processing to match computer-generated lighting on objects that are computer-generated and overlaid on the live action footage. Live action processing system 1122 might operate autonomously, perhaps based on predetermined program instructions, to generate and output the live action metadata upon receiving and inputting the live action footage. The live action footage can be camera-captured data as well as data from other sensors.

An animation creation system 1130 is another part of visual content generation system 1100. Animation creation system 1130 might include computer processing capabilities, image processing capabilities, one or more processors, program code storage for storing program instructions executable by the one or more processors, as well as user input devices and user output devices, not all of which are shown. Animation creation system 1130 might be used by animation artists, managers, and others to specify details, perhaps programmatically and/or interactively, of imagery to be generated. From user input and data from a database or other data source, indicated as a data store 1132, animation creation system 1130 might generate and output data representing objects (e.g., a horse, a human, a ball, a teapot, a cloud, a light source, a texture, etc.) to an object storage 1134, generate and output data representing a scene into a scene description storage 1136, and/or generate and output data representing animation sequences to an animation sequence storage 1138.

Scene data might indicate locations of objects and other visual elements, values of their parameters, lighting, camera location, camera view plane, and other details that a rendering engine 1150 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1130 might be interactive, allowing a user to read in animation sequences, scene descriptions, object details, etc. and edit those, possibly returning them to storage to update or replace existing data. As an example, an operator might read in objects from object storage into a baking processor 1142 that would transform those objects into simpler forms and return those to object storage 1134 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1132 might be used to drive object presentation. For example, if an artist is creating an animation of a spaceship passing over the surface of the Earth, instead of manually drawing or specifying a coastline, the artist might specify that animation creation system 1130 is to read data from data store 1132 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1144 might read in live action metadata, such as data representing movements and positions of body parts of a live actor during a live action scene. Animation driver generator 1144 might generate corresponding animation parameters to be stored in animation sequence storage 1138 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1122. Animation driver generator 1144 might convert that movement data into specifications of how joints of an articulated CGI character are to move over time.

A rendering engine 1150 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1150 might include computer processing capabilities, image processing capabilities, one or more processors, program code storage for storing program instructions executable by the one or more processors, as well as user input devices and user output devices, not all of which are shown.

Visual content generation system 1100 can also include a merging system 1160 that merges live footage with animated content. The live footage might be obtained and input by reading from live action footage storage 1120 to obtain live action footage, by reading from live action metadata storage 1124 to obtain details such as presumed segmentation in captured images segmenting objects in a live action scene from their background (perhaps aided by the fact that green screen 1110 was part of the live action scene), and by obtaining CGI imagery from rendering engine 1150.

A merging system 1160 might also read data from rulesets for merging/combining storage 1162. A very simple example of a rule in a ruleset might be "obtain a full image including a two-dimensional pixel array from live footage, obtain a full image including a two-dimensional pixel array from rendering engine 1150, and output an image where each pixel is a corresponding pixel from rendering engine 1150 when the corresponding pixel in the live footage is a specific color of green, otherwise output a pixel value from the corresponding pixel in the live footage."

Merging system 1160 might include computer processing capabilities, image processing capabilities, one or more processors, program code storage for storing program instructions executable by the one or more processors, as well as user input devices and user output devices, not all of which are shown. Merging system 1160 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1160, such as modifying boundaries of segmented objects, inserting blurs to smooth out imperfections, or adding other effects. Based on its inputs, merging system 1160 can output an image to be stored in a static image storage 1170 and/or a sequence of images in the form of video to be stored in an animated/combined video storage 1172.

Thus, as described, visual content generation system 1100 can be used to generate video that combines live action with computer-generated animation using various components and tools, some of which are described in more detail herein. While visual content generation system 1100 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data that includes image data having shadow details generated using the methods described herein. The carrier medium can comprise any medium suitable for carrying the image data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

For example, FIG. 12 is a block diagram that illustrates a computer system 1200 upon which the computer systems of the systems described herein and/or visual content generation system 1100 (see FIG. 11) may be implemented. Computer system 1200 includes a bus 1202 or other communication mechanism for communicating information, and a processor 1204 coupled with bus 1202 for processing information. Processor 1204 may be, for example, a general-purpose microprocessor.

Computer system 1200 also includes a main memory 1206, such as a random-access memory (RAM) or other dynamic storage device, coupled to bus 1202 for storing information and instructions to be executed by processor 1204. Main memory 1206 may also be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a computer monitor, for displaying information to a computer user. An input device 1214, including alphanumeric and other keys, is coupled to bus 1202 for communicating information and command selections to processor 1204. Another type of user input device is a cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a network connection. A modem or network interface local to computer system 1200 can receive the data. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be a network card, a modem, a cable modem, or a satellite modem to provide a data communication connection to a corresponding type of telephone line or communications line. Wireless links may also be implemented. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world-wide packet data communication network now commonly referred to as the "Internet" 1228. Local network 1222 and Internet 1228 both use electrical, electromagnetic, or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220, and communication interface 1218. In the Internet example, a server 1230 might transmit a requested code for an application program through the Internet 1228, ISP 1226, local network 1222, and communication interface 1218. The received code may be executed by processor 1204 as it is received, and/or stored in storage device 1210, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for interpolating image data in an image dataset that includes depth information, the method comprising:
 under the control of one or more computer systems configured with executable instructions:
 obtaining the image dataset in computer-readable form, wherein the image data in the image dataset comprises a plurality of pixel image value arrays, including a first pixel image value array having a first set of image value array samples and a second pixel image value array having a second set of pixel image value array samples, wherein each pixel image value array comprises an association with an associated pixel position and each pixel image value array sample comprises a respective image value, a respective depth value, and a respective association with a respective associated pixel position, wherein a first associated pixel position associated with the first set of image value array samples is different than a second associated pixel position associated with the second set of image value array samples;
 determining a first accumulation curve for the first set of pixel image value array samples and a second accumulation curve for the second set of pixel image value array samples, wherein an accumulation curve represents a cumulative image value as a function of depth of an image value array;
 determining an interpolated accumulation curve from at least the first accumulation curve and the second accumulation curve;
 determining an interpolated set of pixel image value array samples from the interpolated accumulation curve and forming therefrom an interpolated image value array;
 storing the interpolated set of pixel image value array samples as an interpolated deep pixel of an interpolated deep image; and
 generating a modified image dataset for the interpolated deep image.

2. The computer-implemented method of claim 1, wherein the respective image value comprises pixel color values, wherein the interpolated set of pixel image value array samples comprise interpolated pixel color values, and wherein the image dataset and the modified image dataset comprise pixel color values for pixels over an image.

3. The computer-implemented method of claim 1, wherein a first sample of the first pixel image value array has a first depth range and a second sample of the second pixel image value array has a second depth range, the method further comprising:
 determining if the first depth range and the second depth range overlap in depth; and
 if the first depth range and the second depth range overlap in depth:
  (a) generating a first interpolated sample of an interpolated pixel image value array corresponding to a first portion of the first sample for a second portion of the first depth range that does not overlap with the second depth range;
  (b) generating a second interpolated sample of the interpolated pixel image value array corresponding to a third portion of the first sample and a fourth portion of the second sample for portions that overlap in the first depth range and the second depth range; and
  (c) generating a third interpolated sample of the interpolated pixel image value array corresponding to a fifth portion of the second sample for a sixth portion of the second depth range that does not overlap with the first depth range.

4. The computer-implemented method of claim 1, wherein the cumulative image value as the function of depth is from a furthest depth to a nearest depth.

5. The computer-implemented method of claim 1, wherein the cumulative image value as the function of depth is from a nearest depth to a furthest depth.

6. The computer-implemented method of claim 1, wherein samples are tagged as thin samples or thick samples, and wherein thin samples are processed as discontinuities in accumulation curves.

7. The computer-implemented method of claim 1, wherein the image dataset comprises data for a two-dimensional pixel array of R rows and C columns, R and C being positive integers, wherein the image data comprises R times C pixel image value arrays, one per pixel, wherein a number of pixel image value array samples in image value arrays may vary, and wherein each pixel image value array sample comprises a pixel color value, an alpha value, a depth value or depth range, and each pixel image value array sample is associated with one of the R times C pixels of the image data.

8. The computer-implemented method of claim 1, wherein each pixel image value array comprises array samples each having depth information that indicates, for its associated pixel, one or more contributing objects that contribute to a color value of the associated pixel, wherein a contributing object of the one or more contributing objects is represented by a depth or a depth range.

9. The computer-implemented method of claim 8, wherein the contributing object is contributing to a first pixel color of a corresponding pixel when a position of the contributing object intersects, or is within a ray or volume defined by bounds of, rays from a camera position through the corresponding pixel.

10. The computer-implemented method of claim 1, further comprising:
    parsing pixel samples of input deep pixels based on object identifiers associated with the pixel samples; and
    generating interpolated pixel samples based on the object identifiers, whereby a pixel sample value for an interpolated pixel having a particular object identifier is computed from input pixel samples specific to that particular object identifier.

11. The computer-implemented method of claim 1, further comprising truncating the interpolated deep pixel at a truncation sample representing an object that fully occludes farther objects at a pixel location corresponding to the interpolated deep pixel.

12. A non-transitory computer-readable storage medium storing instructions, which when executed by at least one processor of a computer system, causes the computer system to carry out the method of claim 1.

13. A non-transitory computer-readable medium carrying instructions, which when executed by at least one processor of a computer system, causes the computer system to carry out the method of claim 1.

14. A computer system comprising:
    one or more processors; and
    a storage medium storing instructions, which when executed by the one or more processors, cause the computer system to implement the method of claim 1.

15. A non-transitory carrier medium carrying interpolated image data that includes depth information generated according to the method of claim 1.

* * * * *